June 10, 1930.  J. LUNDGREN  1,763,402
MEANS FOR AND METHOD OF BALANCING
Filed May 8, 1924    3 Sheets-Sheet 1

Inventor-
Jacob Lundgren.
by his Attorneys.

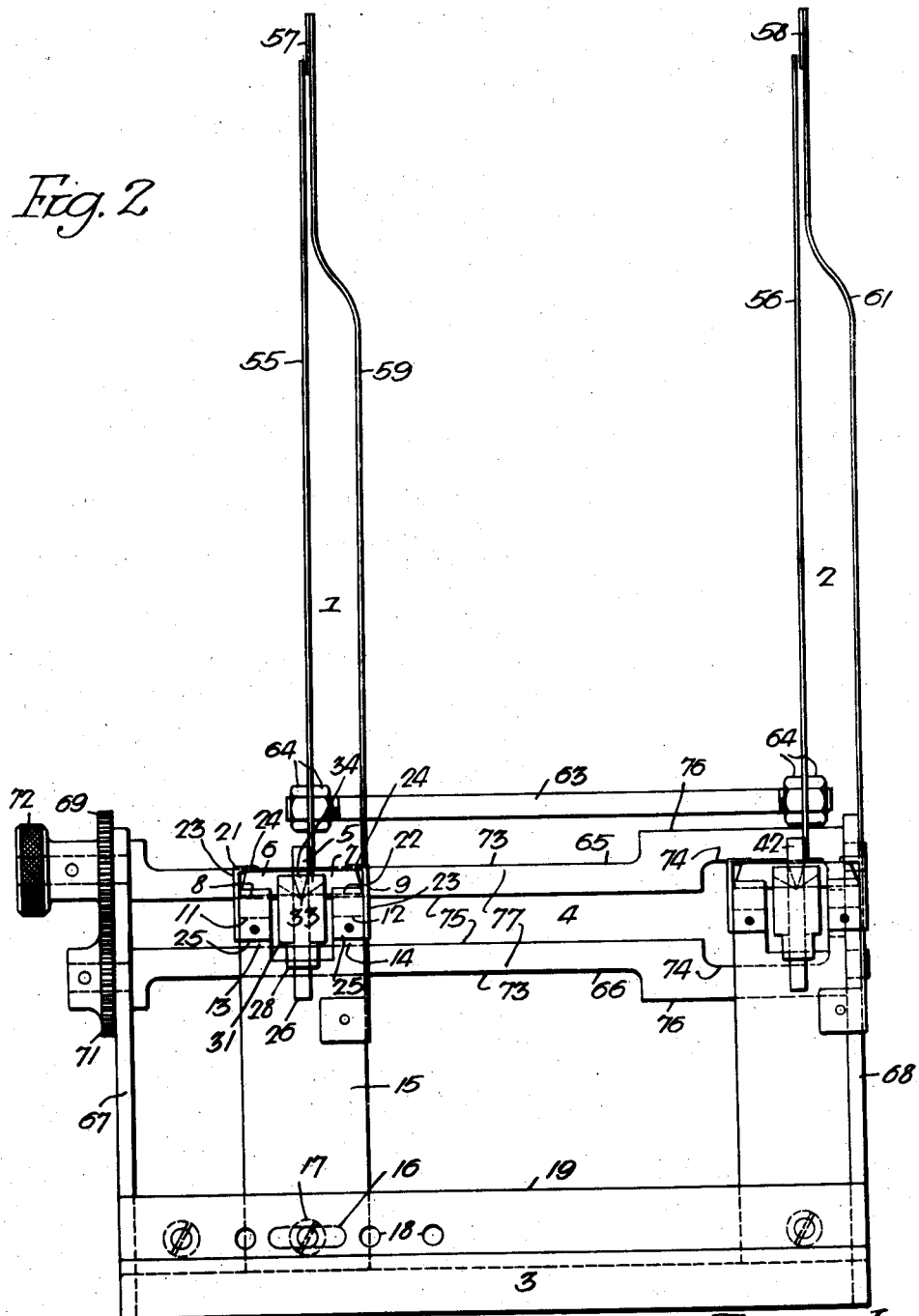

June 10, 1930.  J. LUNDGREN  1,763,402
MEANS FOR AND METHOD OF BALANCING
Filed May 8, 1924    3 Sheets-Sheet 3
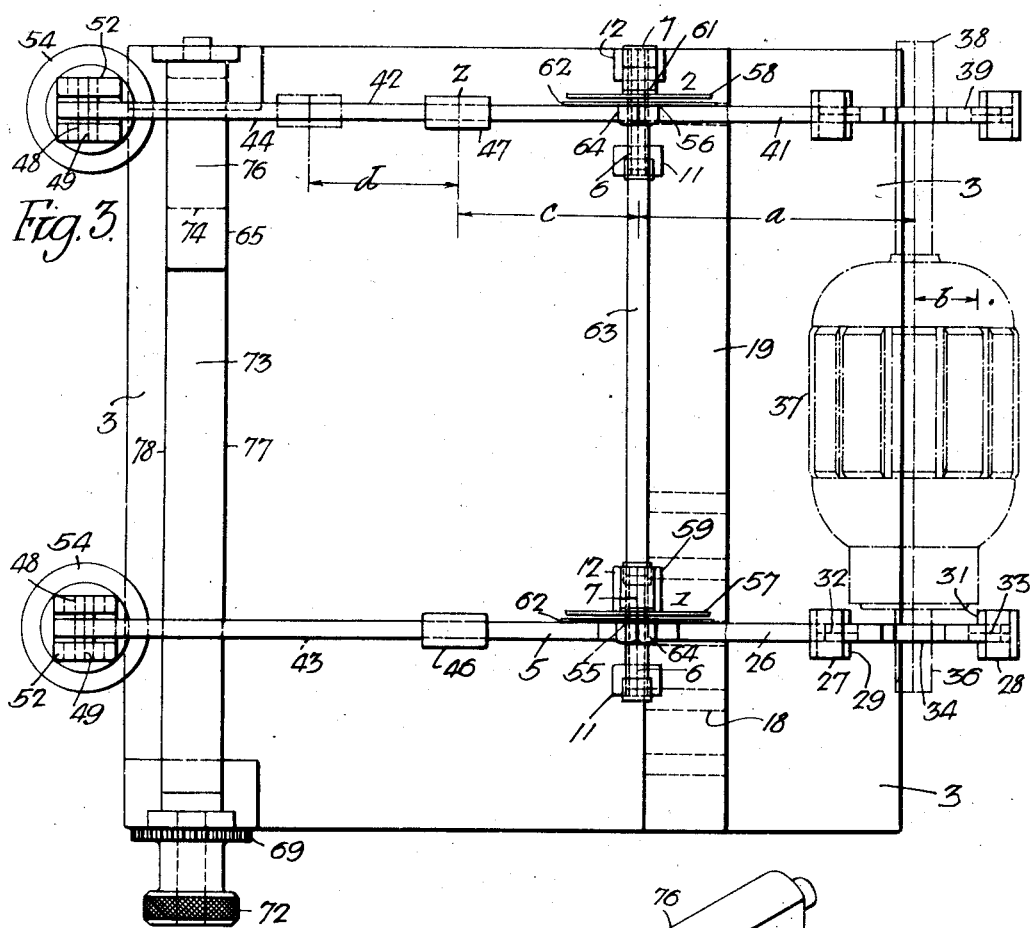
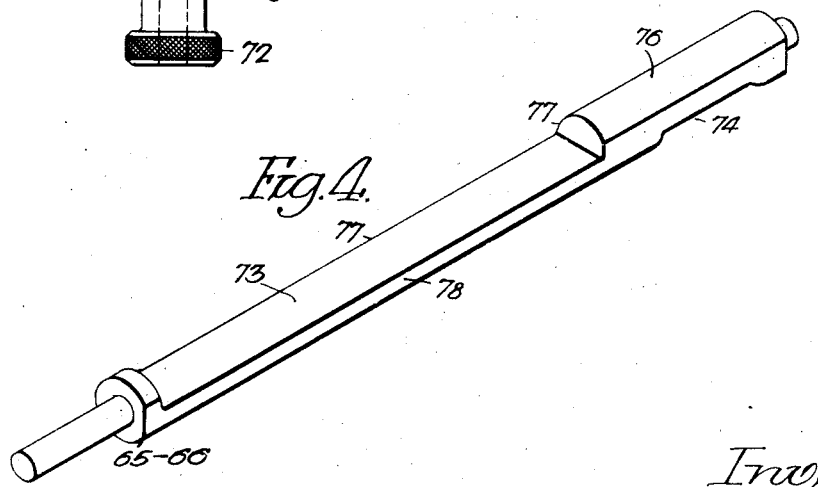
Inventor—
Jacob Lundgren.
by his Attorneys—
Howern & Howern.

Patented June 10, 1930

1,763,402

UNITED STATES PATENT OFFICE

JACOB LUNDGREN, OF PHILADELPHIA, PENNSYLVANIA, ASSIGNOR TO TINIUS OLSEN TESTING MACHINE COMPANY, OF PHILADELPHIA, PENNSYLVANIA. A CORPORATION OF PENNSYLVANIA

MEANS FOR AND METHOD OF BALANCING

Application filed May 8, 1924. Serial No. 711,889.

My invention relates to balancing apparatus and methods of operating the same, and it has particular relation to that class of balancing machines which has a high degree of accuracy.

One object of my invention is to provide a method of determining the unbalanced condition of a body, wherein the usual corrections due to the friction and the inertia of the body may be avoided.

Another object of my invention is to provide a machine for determining the unbalanced condition of a body, wherein the distance of its geometrical axis or centre of gravity relative to a predetermined fixed point is varied to produce a measurable effect.

A further object of my invention is to provide a machine of the class described, which registers the difference in weight of a body as the angular position thereof is varied, the desired result, i. e., the balancing weight, being unaffected by the axial position of the centre of gravity of the body.

A still further object of my invention is to provide means for and method of determining the weight necessary to statically balance a body as well as the axial point of application of the weight of the body.

With these and other objects and applications in mind, my invention further consists in the details of construction and operation hereinafter described and claimed and illustrated in the accompanying drawings, wherein, Fig. 1 is a side elevational view of a static and dynamic balancing scale, illustrating one form of embodiment of my invention;

Fig. 2 is a right end elevational view of the structure of Fig. 1;

Fig. 3 is a top plan view of the structure of Fig. 1; and

Fig. 4 is a detail perspective view of one of the beam-locking bars.

Figure 1:
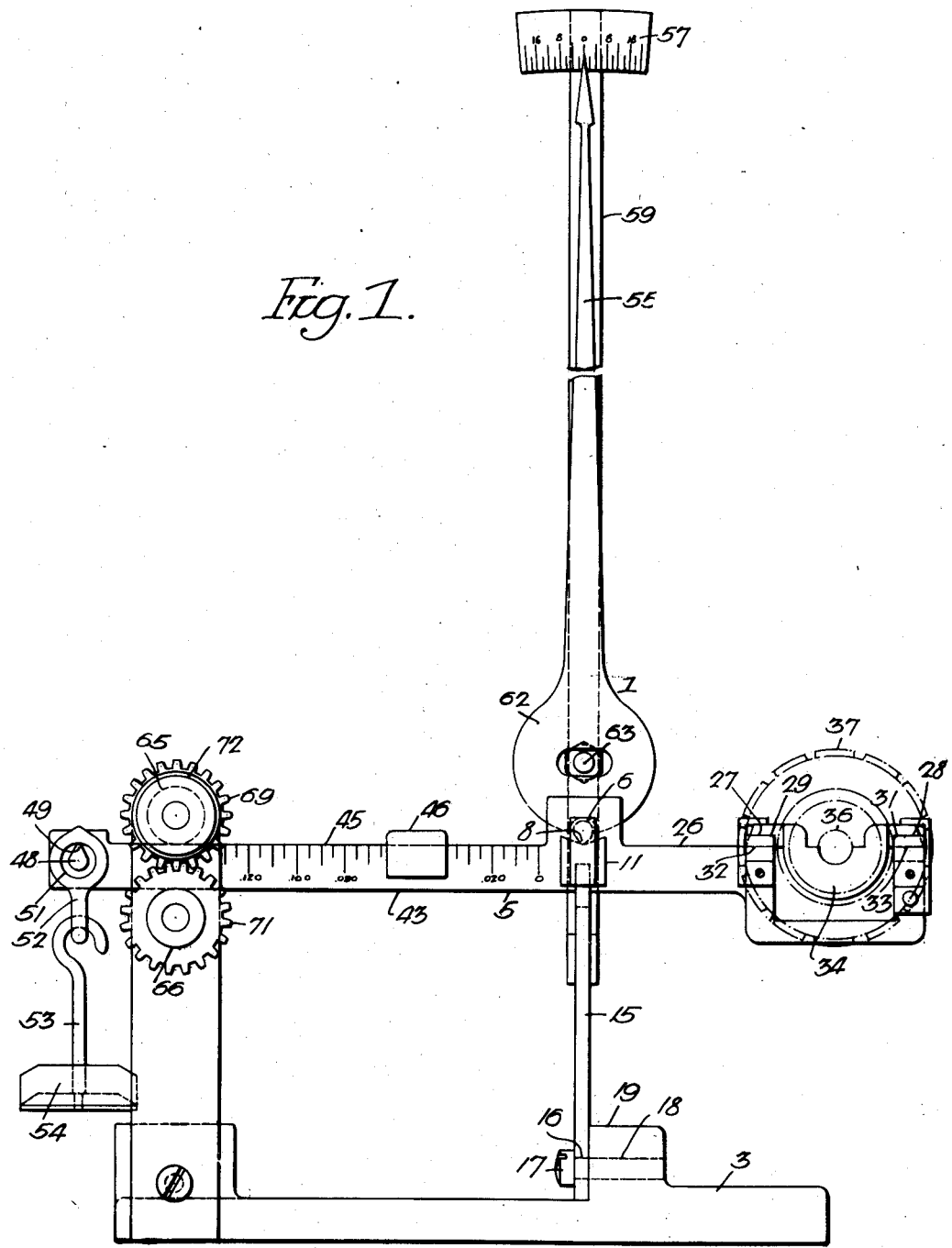

In the illustrated form of embodiment of my invention shown in the drawings, I provide, in general, a pair of balancing scales 1 and 2 which are mounted on a base 3 and which are adapted to be locked selectively by apparatus 4, all as will be explained more fully hereinafter.

The balancing scale 1, of which the balancing scale 2 is substantially a duplication, comprises a balancing beam 5 which is provided with oppositely extending pivots 6 and 7. The pivots 6 and 7 are provided with knife edges 8 and 9 which engage pivot supports 11 and 12, respectively, the latter being rigidly mounted on spaced vertical arms 13 and 14 of a beam support or standard 15. A lower end of the beam support 15 is provided with a horizontally extending slot 16 adapted to receive a screw member 17 extending into one of a series of threaded perforations 18 formed in a shoulder 19 on the top side of the base 3, whereby the beam support 15 as well as the beam 5 may be bodily adjusted to a desired position and then rigidly secured on the base 3. The beam pivots 6 and 7 may be retained in position by means of members 21 and 22, respectively, each of which comprises an end portion 23 for preventing undesirable lateral movement; a substantially horizontal top flange 24 for preventing a vertical movement of the pivots 6 and 7 from the supports 8 and 9; and side portions 25 perforated to receive screws for securing the whole in position.

A rear end portion 26 of the balancing beam 5 is provided with spaced arms 27 and 28 for the reception of pivot supports 29 and 31, respectively, the latter being grooved to receive the knife edges of pivots 32 and 33 of a swivel bearing or cradle 34. The pivot supports 29 and 31 are so disposed that the bearing 34 is fulcrumed in the plane of the beam end portion 26. As shown in Fig. 1 of the drawings, the swivel bearing 34 provides a revoluble mounting for one end 36 of a body 37 to be balanced. A remaining end 38 of the body 37 may be revolubly mounted in a similar swivel bearing 39 formed on a corresponding end portion 41 of a similar balancing beam 42 of the other balancing scale 2.

The remaining end portions 43 and 44 of the balancing beams 5 and 42, respectively, are provided with similar graduations 45—45. The beam end portions 43 and 44 also provide slidable mountings for beam weights 46 and 47, respectively. The outer end of each balancing beam is provided with oppositely extending pivots 48—48, upper knife edges 49 of which engage perforations 51 formed in the end portions of U-shaped members 52. A weight holder 53 (Fig. 1) may be detachably supported by the beam hinge 52 and it is provided with one or more weights 54 sufficient to balance the beam when the weights 46—47 register with the zero marking of the graduations 45.

The beams 5 and 42 may be provided with vertical pointers 55 and 56 (Fig. 2) which are adapted to move respectively over graduated scales 57 and 58 supported upon vertically-extending members 59 and 61, the lower ends of which are secured to the beam supports 15. The base portion of the pointers 55 and 56 is enlarged as at 62—62, and it is provided with perforations adapted to receive the threaded ends of a rod 63, cooperating nuts 64 serving to clamp the same rigidly in position, whereby the beams 5 and 42 may be rigidly connected together, for reasons as will appear more fully hereinafter.

The locking apparatus 4 (Fig. 2) comprises a pair of cylindrical locking bars 65 and 66 which are positioned immediately adjacent to the upper and lower edges, respectively, of the beam end portions 43 and 44. The opposite ends of the locking bars 65 and 66 are revolubly supported in position by lock-supports or standards 67 and 68. One end of the locking bars 65 and 66 may be provided with meshing gear-wheels 69 and 71 so that both locking bars may be operated simultaneously. For purposes of convenience, an operating knob 72 may be secured to the gear-wheel 69.

As shown in Fig. 2 and more especially in Fig. 4, each of the bars 65 and 66 is provided with recessed portions 73 and 74 which are respectively spaced immediately adjacent to the end portions 43 and 44.

The character of the recesses 73 and 74 is such that when the knob 72 is turned to move the bars 65 and 66 into the position shown in Fig. 2 of the drawing, recesses 74—74 register, thereby permitting the beam 42 to move, providing beams 5 and 42 are not mechanically interconnected by the rod 63. In such position, however, the recesses 73—73 are oppositely positioned and adjacent sides 75—75 of the locking bars 65 and 66 are so positioned as to engage the upper and lower edges of the beam end portion 43 as to lock the same rigidly in position.

When the gear knob 72 is so moved as to turn the locking bars 65 and 66 through 180°, the recesses 73—73 register so that the beam end portion 43 is unlocked. Such movement, however, causes the recesses 74—74 to move out of the registering position shown in Fig. 2, and results in the actuation of sides 76—76 of the locking bars 65 and 66 into engagement with the upper and lower edges of the beam end portion 44, whereby the latter may be locked in position.

When the gear knob 72 is so turned as to actuate the locking bars 65 and 66 through an angle of 90° from the position of Fig. 2, both beams 5 and 42 are locked in position inasmuch as sides 77—77 of the locking bars 65 and 66 engage the top and bottom edges, respectively, of the beam end portions 43 and 44.

Since it is desirable that the locking bars 65 and 66 have a position, wherein both beams 5 and 42 may move together, as when the same are mechanically interconnected by the rod 63, sides 78—78 of the bars 65 and 66, which are positioned opposite to the respective sides 77—77, may be cut away as shown in Fig. 4. Hence, when the knob 72 is actuated to bring the flat sides 78—78 immediately adjacent to the top and bottom edges, respectively, of the beam end portions 43 and 44, the beams 5 and 42 may be moved simultaneously or independently.

As hereinabove noted, my invention contemplates means for and method of determining the unbalanced condition of a body as well as the weight necessary to restore the same to a condition of balance. In determining the required balancing weight, the locking bar 63 is removed to permit the beams 5 and 42 to operate independently and the gear knob 72 is actuated to lock one or the other of the beams 5 and 42, say the former, as shown in Fig. 2. The beam 42 is now free to move and since the center of the gravity of the body 37 is eccentric with respect to the longitudinal axis of the body 37 by reason of the unbalanced condition thereof, if the body 37 is successively moved through spaced angular positions, say of 180°, and the position of the weight 47, which is necessary to balance the body 37 in each position, is noted, equations may be written which when solved will give the weight which is necessary to be applied to the body 37 to balance the same.

For purposes of illustration, I shall now give a practical example of the solution of a design problem involving the several steps just set-forth. Let us assume that the longitudinal axis of the body 37 is positioned a distance $a$ from the beam pivots 6 and 7; that the unknown balancing weight $w$ is to be positioned a desired distance $b$ from the longitudinal axis of the body 37; that the movable member 47 has a weight $z$; that the movable element 47 is positioned distances $c$ and $d$ as the body 37 occupies successive angular positions of 180°; then the following equations may be written:

(1) $zc = (a-b)\ w$
(2) $zd = (a+b)\ w$

On adding these equations and solving for $w$, we obtain the following equation:

(3) $w = z\left(\dfrac{c+d}{2a}\right)$

Since the point of application of the weight $w$ has been assumed as equal to the radial distance $b$, and since the weight $w$ may be ascertained from Equation (3), the body 37 may be readily balanced. Similar results may be obtained when the balancing scale 2 is locked and the scale 1 is unlocked by the operation of the gear knob 72.

To determine the desired axial position of the weight $w$ on the body 37, the gear knob 72 is moved to release both beams 5 and 42. The change in position of the weights 46 and 47 is then observed as the body 37 is successively moved through angular positions of 180°, from which equations may be written, the solution of which gives the desired axial point of application of the weight $w$, all as will be understood by those skilled in the art. Experience has shown that when the body 37 is narrow, i. e., of short axial dimensions, the inaccuracy due to an axial error in the location of the unbalance is so small that it is preferable to test the body 37 for unbalance with the beams 5 and 42 operating as one unit. As above noted, the beams 5 and 42 may be caused to operate as a unit by the rod 63. This rod, however, may be replaced by any form of device adapted to associate mechanically the beams 5 and 42 to effect the desired common operation.

When the balancing machine is not in use, the operating knob 72 is moved to bring the sides 77—77 of the locking bar 65 and 66 into position so as to securely lock the beams 5 and 42 in position.

While I have shown only one form of embodiment of my invention, for the purpose of describing the same and illustrating its principle of construction and operation, it is apparent that various changes and modifications may be made therein without departing from the spirit of the invention and I desire, therefore, that only such limitations shall be imposed thereon as are indicated in the appended claims or as are demanded by the prior art.

I claim:

1. A weighing instrument comprising a beam having a fulcrumed cradle affording a rotative support for a body to be tested, and supporting means for said beam permitting a movement thereof.

2. Balancing apparatus comprising a pivoted arm having a cradle fulcrumed in the plane of said arm, said cradle affording the body to be tested a rotative support.

3. In combination, a beam, pivoting means for said beam, a cradle supported on said beam and providing a revoluble mounting for a body to be balanced, a main counterbalancing weight, and an auxiliary weight for balancing the body for different angular positions.

4. A balancing device comprising a plurality of beams providing a support for a device to be tested, supporting means for said beams permitting a movement thereof, and a single locking device for said beams.

5. A machine of the class described comprising a pair of beams, supporting means for said beams permitting a movement thereof, and a single device for selectively and collectively locking said beams.

6. In combination, a pair of beams adapted to provide a mounting for a body to be tested, supporting means for said beams permitting a movement thereof, pointers for said beams, and means for causing said pointers to operate in unison.

7. In combination, a plurality of beams adapted to support a device to be tested, means for pivoting said beams, means for selectively locking said beams, and means for so operatively associating said beams as to cause the same to operate in unison.

8. A balancing scale comprising a plurality of beams adapted to provide a revoluble mounting for a device to be tested, supporting means for said beams permitting a movement thereof, weights carried by said beams, and a single device for locking one or the other or both of said beams.

9. In combination, a plurality of beams, means for pivoting said beams, indicating means including a pointer and scale operatively associated with each beam, and means for so mechanically associating said beams as to cause the same to operate in unison.

10. In combination, a pair of beams adapted to so support a body to be tested as to permit a change in the moment-arm of the body, supporting means for said beams permitting a movement thereof, counterbalancing means, means for indicating the variations in the moment-arm of said body, means for selectively locking said beams, and means adapted to interconnect rigidly said beams.

11. A balancing machine comprising a pivoted beam adapted to support a body to be tested, counter-balancing means for said beam, means adapted to balance said beam upon a change in the position of said body, means for cooperating with said beam, whereby it may be locked in position, and means affording said beam a bodily adjustable mounting.

12. A balancing scale comprising a pair of movable beams responsive to a body to be tested, means for indicating changes in the position of said body, and a pair of coacting locking bars operatively associated with and common to said beams, whereby one or the other or both of said beams may be locked in position.

13. A balancing machine comprising a movable beam responsive to a body to be tested, counter-balancing means for said beam, means adapted to balance said beam upon a change in the position of said body, and a pair of locking bars cooperating with opposite portions of said beam, said bars being so formed that they successively lock and release said beam.

14. In combination, a plurality of beams, supporting means for said beams permitting a movement thereof, a corresponding plurality of pointers therefor, and a rod rigidly securing said pointers together.

15. In a balancing machine, the combination with a plurality of movable beams, of a pair of locking bars operatively associated therewith, said bars being so formed as to lock one or the other or all of said beams, and common actuating means for said bars.

16. A balancing device comprising a plurality of beams, adapted to provide a support for a device to be tested, and means whereby at least one of said beams may be adjusted bodily relative to another beam.

17. The method of determining the axial point of unbalance in a body while maintaining said body in substantially static condition which comprises determining the moments thereof for different angular positions first from one end of said body and then from the other end thereof.

18. A balancing machine comprising a beam for supporting a body to be tested, means for pivoting said beams, means for indicating changes in the position of said body, and a pair of locking bars adapted to successively lock and release said beam, said bars having common actuating means.

19. Apparatus of the class described comprising a pair of beams, supporting means for said beams permitting a movement thereof, and a pair of coacting locking bars so formed as to lock one or the other or both of said beams, said bars also permitting the free movement of both of said beams.

20. Apparatus of the class described comprising a plurality of beams, supporting means for said beams permitting a movement thereof, a pair of elements for locking one or the other or all of said beams, said elements also permitting the free movement of said beams, and common actuating means for said elements.

21. Apparatus of the class described comprising a pair of movable beams having pointers individual to said beams, cradles for the body to be tested fulcrumed on said beams, and means for selectively locking said beams.

22. Apparatus of the class described comprising a pair of relatively movable standards, beams respectively fulcrumed on said standards, and a pair of pointers respectively mounted on said beams.

23. Apparatus of the class described comprising a pair of standards, beams respectively fulcrumed on said standards and adapted to support the device to be tested, a pair of pointers respectively mounted on said beams, a second pair of standards, a pair of locking elements rotatably supported by said second pair of standards, and means for actuating said elements.

24. Apparatus of the class described comprising a pair of standards, beams respectively fulcrumed on said standards and adapted to support the device to be tested, a pair of pointers respectively mounted on said beams, scales for said pointers, a second pair of standards, a pair of locking elements rotatably supported by said second pair of standards, and means for actuating said elements.

25. Apparatus of the class described comprising a pair of standards, beams respectively fulcrumed on said standards, a pair of pointers respectively mounted on said beams, scales for said pointers, a second pair of standards, a pair of locking elements rotatably supported by said second pair of standards, means for actuating said elements, and means for causing said pointers to operate in unison.

26. Apparatus of the class described comprising a base having a pair of spaced pedestals, a pair of members respectively fulcrumed on said pedestals and provided with pointers, a second pair of standards, a pair of locking bars so mounted on said second pair of standards as to be positioned on the upper and lower sides of said beams, respectively, and means for actuating said bars.

27. Apparatus of the class described comprising a base having a pair of spaced pedestals, a pair of members respectively fulcrumed on said pedestals and provided with pointers, a pair of standards, a pair of locking bars mounted on said pair of standards for selectively locking said members, and removable means for causing said pointers to operate in unison.

28. A balancing machine comprising a plurality of beams, supporting means for said beams permitting a movement thereof, a pair of bars locking one or the other or all of said beams, meshing gear wheels respectively mounted on said bars, and means for actuating said gear wheels.

JACOB LUNDGREN.